United States Patent [19]

Morikuni et al.

[11] Patent Number: 5,134,910
[45] Date of Patent: Aug. 4, 1992

[54] METHOD OF CUTTING ROLL SURFACE

[75] Inventors: Hidenobu Morikuni, Osaka; Mamoru Nishioka, Kyoto; Hiroshi Matsumoto; Kenji Fujihara, both of Nara, all of Japan

[73] Assignee: Kashiwara Machine Mfg. Co., Ltd., Kashiwara, Japan

[21] Appl. No.: 455,337

[22] PCT Filed: May 13, 1988

[86] PCT No.: PCT/JP88/00463
§ 371 Date: May 13, 1990
§ 102(e) Date: Mar. 13, 1990

[87] PCT Pub. No.: WO89/10814
PCT Pub. Date: Nov. 16, 1989

[51] Int. Cl.5 .................................. B23B 1/00
[52] U.S. Cl. ............................ 82/1.11; 409/199; 51/289 R; 82/129
[58] Field of Search ............... 82/1.11, 113, 11, 12, 82/129, 138, 118, 1.4; 51/289 R; 409/199, 200, 132, 166

[56] References Cited

U.S. PATENT DOCUMENTS 4,742,738 5/1988 Strand .............................. 82/1.4
4,827,751 5/1989 Holthoff ....................... 51/289 R X

FOREIGN PATENT DOCUMENTS

| 56301 | 5/1981 | Japan . | |
|---|---|---|---|
| 161002 | 8/1985 | Japan | 82/1.11 |
| 221201 | 11/1985 | Japan . | |
| 255001 | 11/1987 | Japan . | |
| 277202 | 12/1987 | Japan | 82/1.11 |

Primary Examiner—Larry I. Schwartz
Assistant Examiner—Kevin J. Carroll
Attorney, Agent, or Firm—Oblon, Spivak, McClelland, Maier & Neustadt

[57] ABSTRACT

A method of simultaneously cutting the surfaces of a set of a plurality of rolls made flush with one plane, disposed at equal angular intervals, and forming a central caliber therebetween, by means of a cutter provided with cutting tools in the same number as that of the rolls. The cutter holds the cutting edge of the cutting tool in parallel with the cutter shaft and adapts the cutting edge to face the just front side of one of the rolls for the purpose of cutting. In cutting, in addition to the movement of the cutter in the axial direction Z and circumferential direction θ, the cutting tool moves in the radial direction R of the cutter shaft. Thus, the cutting edge $21a'$ is kept facing the roll shaft at right angles all the time in spite of positional change in the circumferential direction θ, whereby simultaneous and continuous shaping of not only the caliber surface but also round parts 10b on both sides of the shoulder and 120° surface is made possible.

1 Claim, 6 Drawing Sheets 5,134,910

METHOD OF CUTTING ROLL SURFACE

DESCRIPTION

1. Technical Field

The present invention relates to a method of cutting a roll surface (rolling surface) and, in particular, to a method appropriate to the cutting of a roll of a three-roll type rolling machine (stretch reducer) used for manufacturing seamless steel pipes.

2. Background Art

The above three-roll type rolling machine comprises a plurality of (20 or more) roll stands arranged in tandem pattern, each incorporating three rolls and forming a central caliber therebetween. Referring to FIG. 5(a) which shows a roll stand, three rolls 10 ... having axes i ... made flush with one plane are arranged in different directions spaced at equal angular intervals of 120° and form a central caliber 11 of a certain figure therebetween.

In this rolling machine, the caliber 11 of the roll stand decreases in size in a direction of advance from an upstream side to a downstream so that a pipe is gradually squeezed and rolled.

Describing the shape of the roll of this rolling machine in more detail, the roll surface is basically composed of a central caliber surface for forming the caliber 11 and of beveled surfaces 10a, 10b (hereinafter referred to as the "120° surface") adjacent to both sides of the central caliber surface. The caliber 11 formed by a caliber surface 10c ... of the three rolls tends to substantially define a triangular configuration on the upstream side, substantially defines a regular circle with the advance to the downstream, and finally defines a fully regular circle more specifically, the shape (at cross-section) of the caliber surface of a roll is an ellipse having a high degree of flatness (ellipticity: long radius/short radius) on the upstream side, gradually reduces in ellipticity with the advance to the downstream side, and finally attains an ellipticity of zero (0), turning into a fully regular circle.

Each roll on the stand is rounded at shoulders 10b, 10c on both sides of the caliber surface 10c, as shown in FIG. 5(b), for preventing scratches caused by the caliber edge during rolling.

An operation to cut such rolls while keeping the rolls mounted on the roll stand is reasonable as well as efficient, and it is usual to perform the operation in this way.

A known method of simultaneously cutting a plurality of rolls (hereinafter referred to as "set rolls") mounted on the stand is shown in FIG. 6. In this method, a cutter 3 fitted with three cutting tools 31 ... directed outward (outward in the radial direction) is set on a revolving shaft (cutter shaft 30) so as to be positioned in the center (center 0 of the caliber 11) of the roll stand 1 having three rolls 10 mounted thereon, and the cutting tools 31 are adapted to make circular movement against the rolls 10 ... in rotation and along the axial direction i of the roll by the rotation of the cutter shaft 30 (feed for cutting) so as to cut the caliber surface 10c, whereby a shape of the caliber surface to be obtained is various according to the amount of offset [a distance between the plane P (the plane including the axes i of three rolls and will be called "roll shaft arrangement plane" hereafter) and the position A of the tip of the cutting tool] indicated as e in the drawing. As the amount of offset e increases or decreases, the ellipticity increases or decreases, respectively, and a fully regular circle is formed at the offset amount of 0. Incidentally, this method is applicable when a disk cutting tool instead of three cutting tools 31 is used and feed for cutting is substituted by the back-and-forth movement of the cutter shaft 30.

This method, however, is to perform cutting of the caliber surface only and originally lacks a concept and capability of forming the shoulder 10b and 120° surface 10a. The working of these parts must depend on the procedure that, apart from the working of the caliber surface, an exclusive cutting tool 4 is set as shown by the chain line in FIG. 6 and the continuous line in FIG. 7 after cutting the caliber surface 10c in the shape as fixed, and manually operated for additional working, but such additional working must be applied to 6 points, that is, 2 points every roll, one by one and is not only troublesome but also quite difficult in finishing a round part 10b of the shoulder to be continuous with the caliber surface 10c previously finished, without causing stepped portions, thereby requiring a considerably high level of skill. A stepped portion produced at the junction between the caliber surface 10c and the round part 10b of the shoulder, even if small, is a cause of defects such as linear scratches on the outer surface of the pipe.

An appropriate shape of the rounded part of the shoulder varies according to the caliber surface 10c and, as a result, a large number of cutting tools 4 various in shape at cutting edge for shaping the round part must be prepared disadvantageously.

SUMMARY OF THE INVENTION

An object of the present invention is to provide a method of simultaneously cutting the set rolls which enables the cutting of the roll surface into all sorts of shapes at high precision without additional working and, when applied to the roll for the pipe rolling machine, enables the forming of not only the caliber surface in the shape of a regular circle or ellipse but also the round part of the shoulder and 120° surface to be continuous with each other.

DISCLOSURE OF INVENTION

In simultaneously cutting a set of a plurality of rolls 10 ... having axes i ... made flush with one plane, arranged at equal angular intervals, and forming a central caliber 11 therebetween depending on a method of the present invention, as shown in FIGS. 1(a), 1(b) [1(a): a front view, 1(b): a plan view], a cutter 2 is used in which cutting tools 21 corresponding to the above rolls in number and holding the cutting edges 21a so as to direct them in parallel with the cutter shaft 20 are arranged at equal angular intervals around the cutter shaft 20 movable back and forth in the axial direction Z and rotatable in the circumferential direction $\theta$, in such manner as being capable of sliding in the radial direction R of the cutter shaft 20. The cutter 2 is positioned so that the center of the cutter shaft 20 is in alignment with the center axis 0 of the caliber 11 and the cutting edge 21a of each cutting tool faces each roll while being in parallel with the center axis 0 of the caliber, and the cutting tools 21 ... are fed for cutting in the direction i of the roll shaft while being subjected to positional control in directions of the three axes $\theta$, Z, and R for cutting the roll surfaces as desired.

In short, the method of the present invention is to perform cutting with the cutting tools 21 ... fed for cutting in the direction i of the roll shaft while exerting numerical control over positions in the directions of the three axes θ, Z, and R, whereby it is possible to adapt the cutting edge 21a' of the cutting tool to draw any locus and, therefore, to provide any shape for the roll surface.

In the method of the present invention, the cutting edge 21' of the cutting tool, differently from the conventional method (see FIG. 6) in which the cutting edge is directed radially outward, is retained to be in parallel with the cutter shaft 20 and adapted to face the roll 10 ... from the front side thereof for cutting, whereby the cutting edge 21' is always kept at right angles to the roll shaft i regardless of the positional change of the edge in the direction of the axis θ and continuous and simultaneous cutting of not only the surface 10c but also the round parts of shoulders 10b on both sides of the caliber surface 10c and the 120° surface are ensured.

Therefore, according to the method of the present invention, the separation of working for the caliber surface 10c and the round part 10b of the shoulder as has been required up to now is not necessary, the time and work required for working the roll surface are substantially diminished the possibility of causing stepped portions at the junction between the caliber surface 10c and the round part 10b of the shoulder is eliminated, particular skill is not required, and a roll surface unfluctuant in shape can always be obtained.

A caliber surface in the shape of a composite ellipse composed of a plurality of ellipses different in ellipticity from each other is required in some cases and the method of the present invention can easily meet the requirement for such a particular shape of the surface as above.

The method of the present invention for cutting the roll surface is a process to simultaneously cut a plurality of rolls incorporated into a roll stand and capable of freely corresponding to the cutting of the roll surface in any shape, above all, cutting of the roll surface in a particular shape such as the round part of the shoulder of the roll for the pipe rolling machine or the caliber surface in the composite elliptic shape without difficulty. Thus, such additional cutting as hitherto required for the round part of the shoulder in cutting of the roll for the pipe rolling machine is unnecessary and problems following the additional cutting operation which possibly causes stepped portions on the roll surface and suffers disadvantages with respect to man-hours and operation time can be eliminated, thereby significant effects being exhibited.

BRIEF DESCRIPTION OF DRAWINGS

FIG. 1 includes views for explaining the method of the present invention.

FIG. 2 includes views showing the movement of the cutting tool in accordance with the method of the present invention.

FIG. 3 includes views for explaining a working device for performing the method of the present invention in practice.

FIG. 6 includes views for explaining the conventional method of working for set rolls.

BEST MODE FOR CARRYING OUT THE INVENTION

Figure 3A:
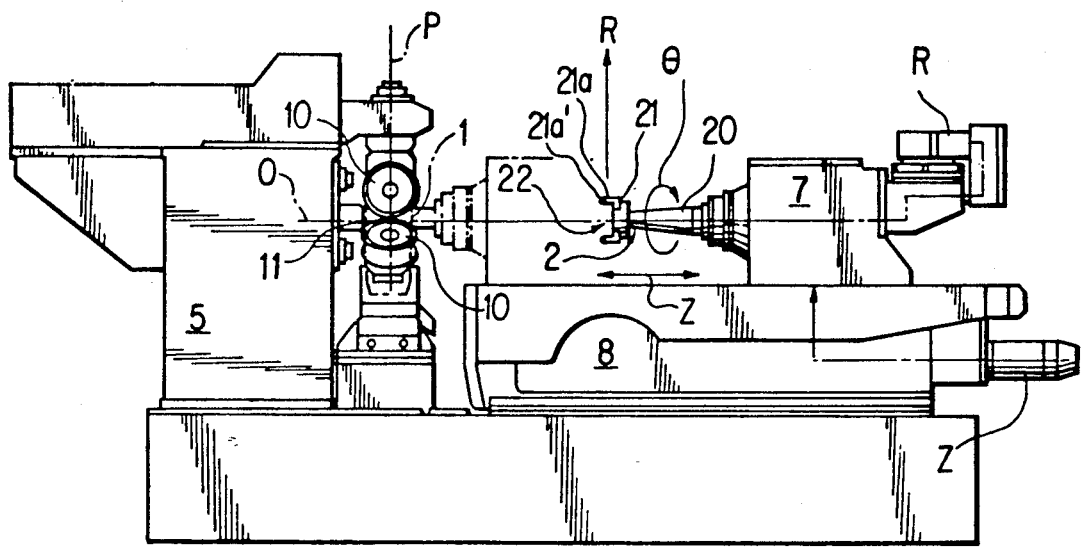
FIGS. 3(a) and 3(b) are a side view and a plan, respectively.
Figure 3B:
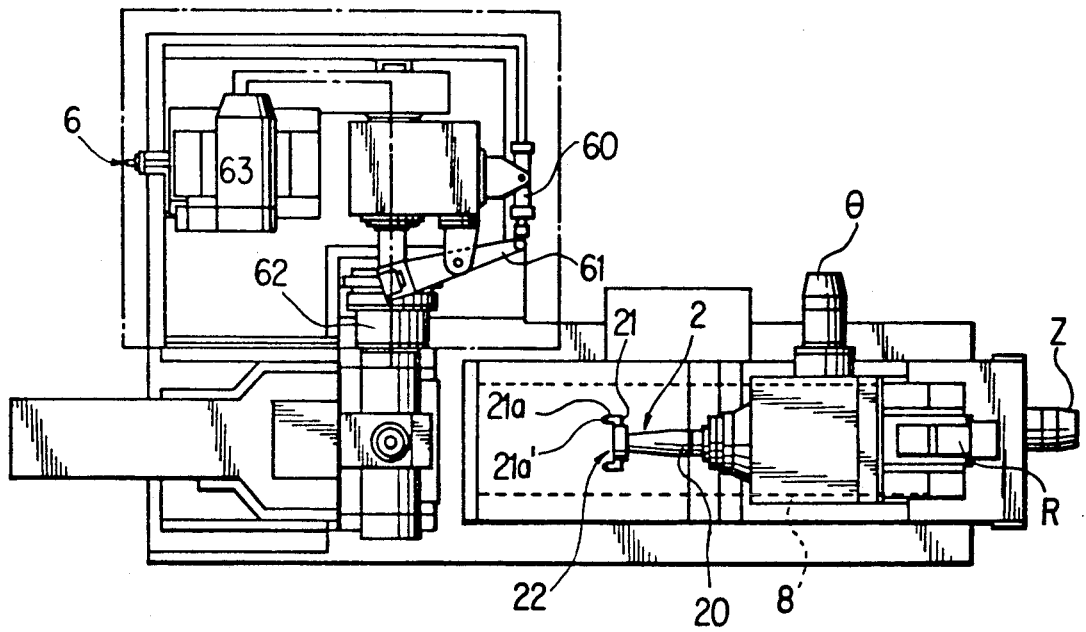

The method according to the present invention will now be described in detail. FIG. 3 shows an example of the apparatus (lathe) for carrying out the present invention, in which FIG. 3(a) is a side view and FIG. 3(b) is a plan view, and FIG. 4 is an explanatory view diagrammatically showing the structure of the above-said apparatus.

In the drawings, the reference numeral 5 indicates a material setting table on which a set of rolls as an object to be cut or the roll stand 1 is set in such manner that the roll arrangement plane P is disposed at right angles to the cutter shaft 20 of the cutter table 7 that will be described later. A driving unit 6 for the roll stand 1 is arranged aside the material setting table 5 in which, when the lever 61 is turned by the air cylinder 60, the coupling 62 is connected to the revolving shaft (not shown) of the roll stand 1 so that revolutions of the driving source 63 are transmitted to the three rolls 10 . . .

The numeral 7 indicates the cutter table disposed on the upper surface of the bed 8 and oppositely to the abovesaid material setting table 5 so as to be movable back and forth in the axial direction Z of the material setting table 5, namely, the cutter shaft 20 that will be described later. The cutter table 7 is provided with a cutter 2 at the front side thereof. The cutter comprises a cutter shaft 20 rotatable in the circumferential direction θ and a cutter head 22 provided at the tip of the cutter shaft, the cutter head 22 having three cutting tools 21 . . . corresponding to the rolls 10 . . . in number and incorporated into the front side of the body thereof slidably in the radial direction R of the cutter shaft. The cutting tools 21 . . . are disposed at equal intervals of 120° in the circumferential direction so as to correspond to respective rolls 10. The cutting tool 21 is fixed so that the cutting edge 21a thereof is in parallel with the cutter shaft 20 and the tip thereof is directed forward (to the side of the material setting table 5). The cutting tool 21 to be used is shaped conical at cutting edge 21a' and free of limit on the cutting direction or non-directional.

Figure 4:
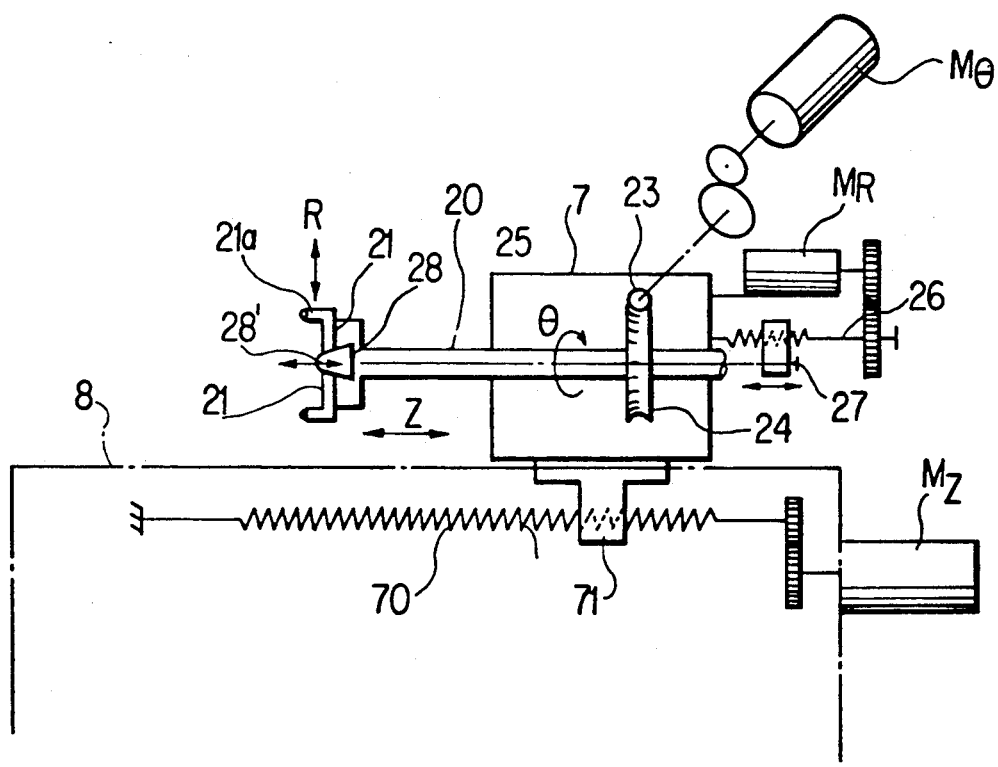
FIG. 4 is a view for explaining a mechanism of the abovesaid device.

A driving mechanism governing the movement of the cutting table 7 in the direction of the axis Z, the revolution of the cutter shaft 20 in the direction of the axis θ, and the movement of the cutting tool 21 in the direction of the axis R is shown in FIG. 4.

The cutter table 7 is so designed as to be slided in the axial direction Z together with a nut 71 projecting from the underside of the cutter table when the nut 71 is brought into engagement with a ball screw 70 provided along the shaft Z in the head 8 and the ball screw 70 is rotated by a servomotor $M_z$.

The cutter shaft 20 is rotated in the direction of the axis θ by the other servomotor Mθ (see FIG. 3) through a worm 23 and worm gear 24.

Each cutting tool 21 in engagement with the slant surface 28' of the cone 28 fixed to the tip of the spindle 25 is moved back and forth in the axial direction R when the spindle 25 axially passing through the cutter shaft is axially slid with a servomotor $M_R$ (see FIG. 1) through the ball screw 26 and nut 27.

A working apparatus as described above, though not shown herein, is additionally provided with a numerical control (NC) device which operates to control the movement in the directions of the three axes Z, $\theta$, and R in accordance with programs inputted therein by digital signals.

When cutting the roll surface using the apparatus as above and depending on the method of the present invention, the operation is performed in sequence as follows:

The set rolls (roll stand 1) to be worked are fixedly mounted on the material setting table 5 in such manner that the center O of the caliber 11 formed by the three rolls 10 . . . is adapted to be aligned with the center of the cutter shaft 21 of the cutter table 7.

Figure 1A:
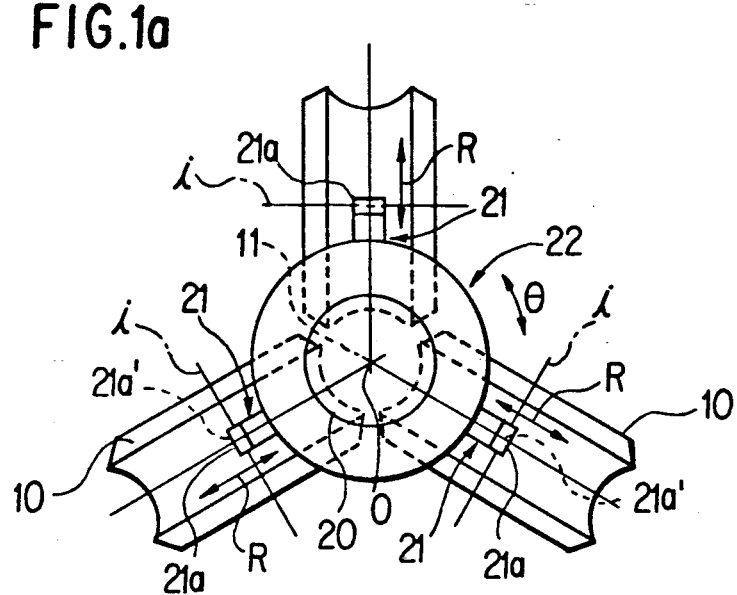
FIGS. 1(a) and 1(b) are a front view and a side view, respectively.
Figure 2A:
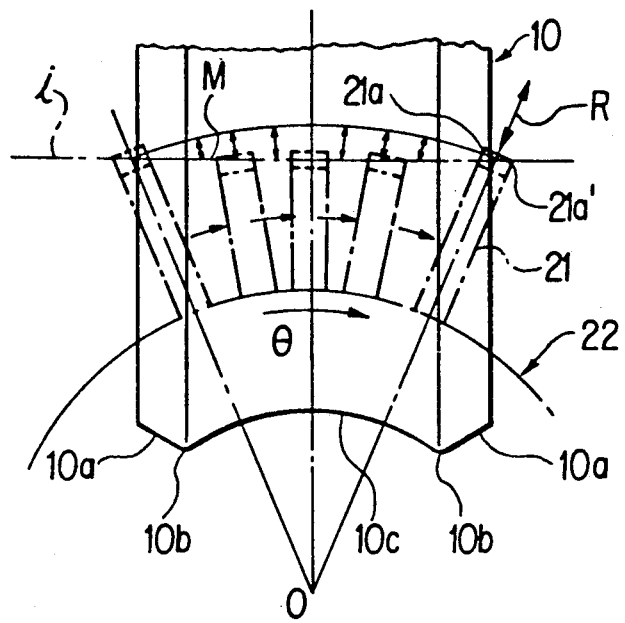
FIGS. 2(a) and 2(b) are a front view and a plan view, respectively.

The three rolls 10 . . . on the roll stand 1 thus set are revolved at high speed after being connected to the driving unit 6 and, while the rolls are kept in this state, the cutting tools 21 . . . of the cutting table 5 are each adapted to correspond to one roll 10, as shown in FIG. 1(a), and fed from one end to the other of the roll 10 for cutting. Feed of the cutting tool 21 (locus of the cutting edge 21a') is made linearly straight as shown by the reference character M in FIG. 2(a) (In practice, the locus of the cutting tool 21 contains the movement in the axial direction Z. The term "linearly straight" means "linearly straight on the coordinate plane having axes $\theta$ and R".). Such feed is performed by synthesizing the movement in the directions of the axes $\theta$ and Z. In other words, the cutting tool 21 is put into circular movement, that is, the movement in the direction of the axis $\theta$ (rotation) and, at this time, a position of the cutting edge is corrected with the movement in the axial direction R so as to draw a linearly straight locus. Since each cutting tool 21 is disposed to be directed in parallel with the axis Z at the cutting edge 21a' as described earlier, the cutting edge 21a' always faces the roll surface at right angles to the roll arrangement plane throughout the abovesaid feed operation, whereby cutting under the same conditions can be applied to the whole length of the roll.

Figure 1B:
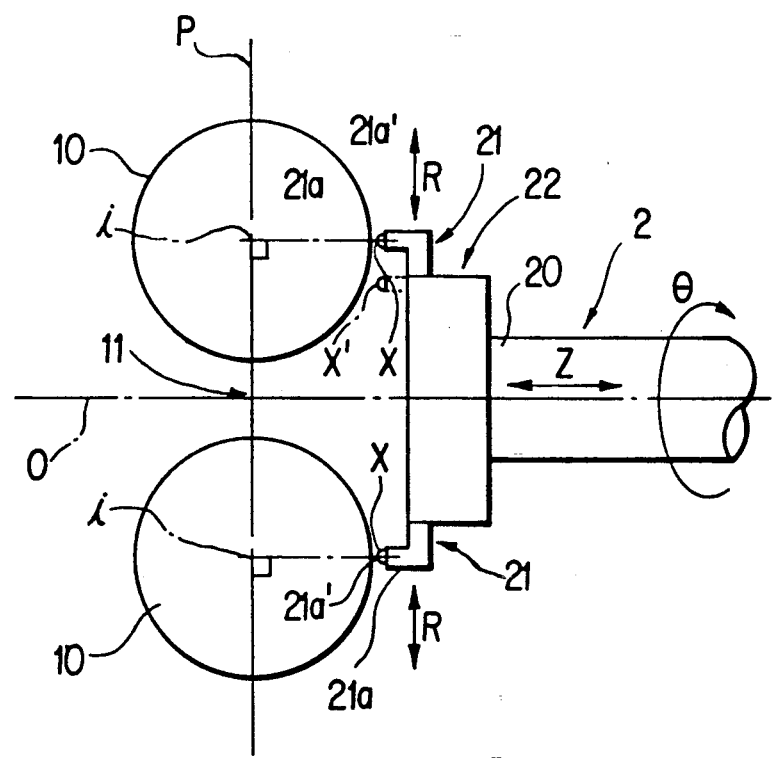

A point to which the cutting tool is applied is indicated at X just in front of the roll 10 (a position at which the cutting edge 21a' is directed to the center of the roll) in FIG. 1. However, it is not subjected to any limit and the cutting tool may be applied to the point X' deviating in the circular direction from the point X as far as a rake angle for cutting is ensured.

Figure 2B:
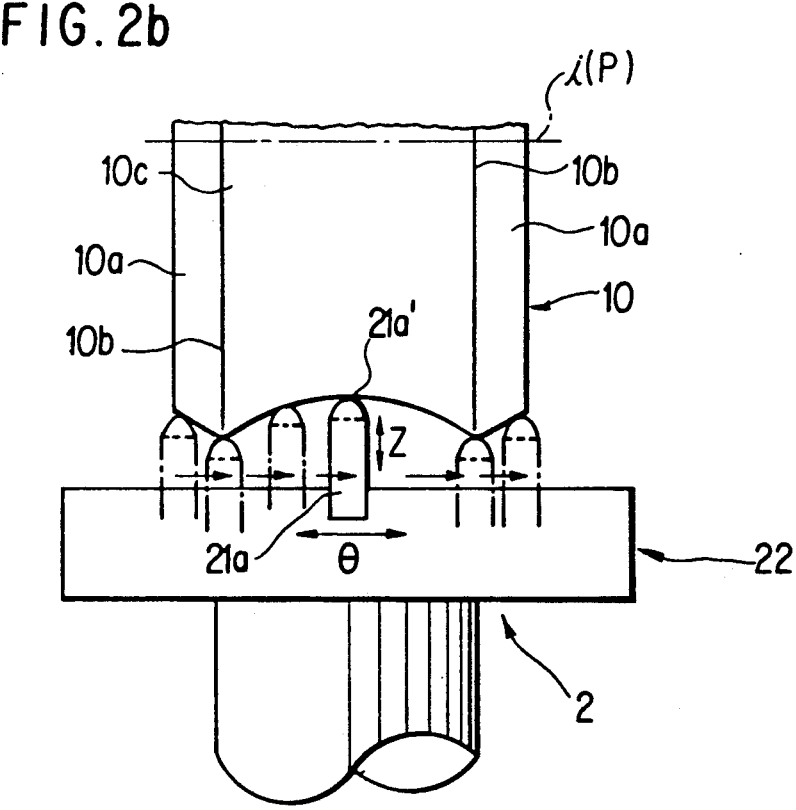
Figure 5A:
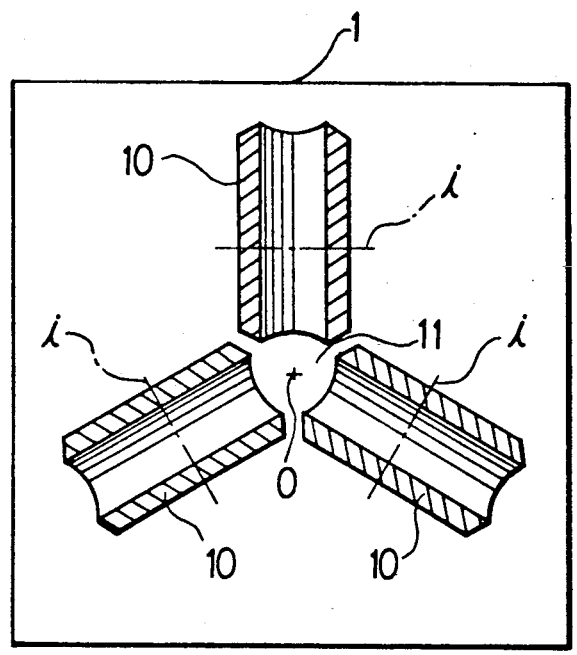
FIG. 5(a) is a model view taken from the front side of a roll stand in the three-roll type rolling machine and FIG. 5(b) is an enlarged partial view of the shape of the surface of a roll incorporated into the roll stand.
Figure 5B:
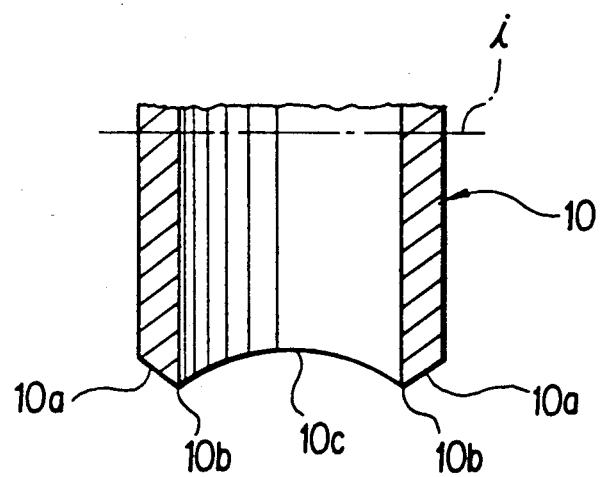
Figure 6A:
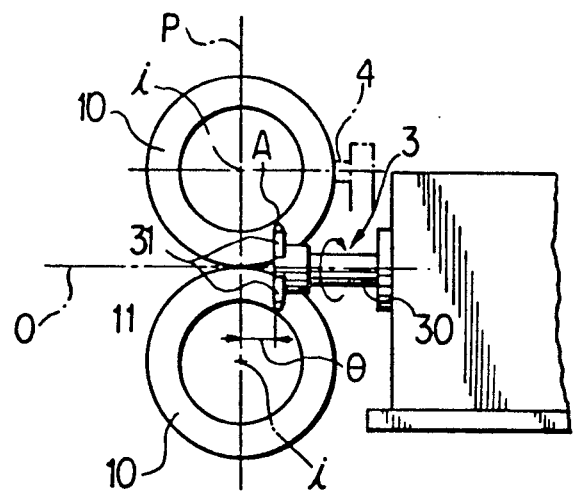
FIGS. 6(a) and 6(b) are a front view and a side view, respectively.
Figure 6B:
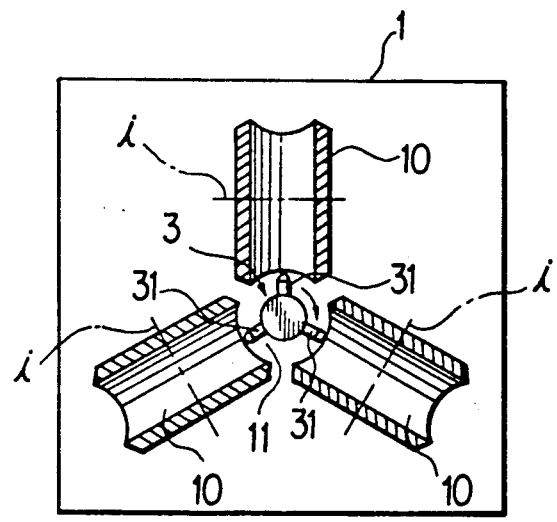
Figure 7:
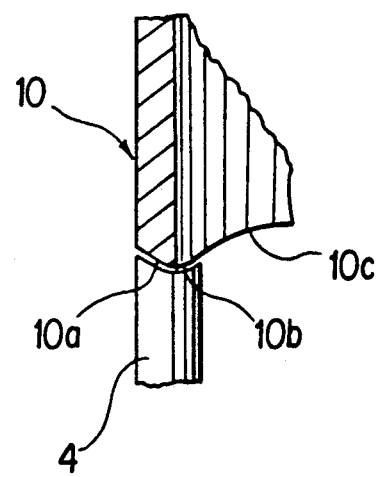
FIG. 7 is a view (plan) for explaining the conventional method of cutting the round part of the shoulder of the roll.

In the above process of feed in the direction of the roll axis, a positional adjustment of the cutting tool in the axial direction Z as shown in FIG. 2(b), that is, the direction of forward cutting (adjustment in amount to be cut), enables any shape of the roll surface. That is, cutting of a roll surface including a 120° surface 10a—round part 10b of the shoulder—caliber surface 10c—round part 10b of the shoulder—and 120° surface 10a as shown in FIG. 5(b) or that having the caliber surface in the shape of composite ellipse is made possible.

Cutting of the roll surface is to be conducted with the movement of the cutting tool 21 in the three axial directions Z, $\theta$, and R and, in practice, a program corresponding to a required shape of the roll surface is inputted into the NC device beforehand and the cutting tools 21 . . . are automatically moved along a required locus under numerical control over the axial directions Z, $\theta$, and R for cutting. In this way, cutting of the roll surface with high precision and in a shape as desired is made possible.

INDUSTRIAL APPLICABILITY

A description of cutting of a set of rolls or three rolls for the pipe rolling machine has been made as above, however, the present invention is not limited to such objects and applicable to cutting of two or four rolls in the same way.

As can be understood from the above description, the method of the present invention makes it possible to cut a roll having the flat caliber surface and provides an advantage unobtainable from the conventional method of cutting the roll surface.

What is claimed is:

1. A method of simultaneously and continuously cutting roll surfaces into a predetermined shape wherein a plurality of rolls having rotational axes which are disposed in a single vertical plane and at equal angular intervals define a central caliber therebetween, said method comprising the steps of:

using a cutter comprising cutting tools disposed on a cutter shaft in which the number of cutting tools corresponds to the number of said rolls, each of said cutting tools having cutting edges disposed around said cutter shaft, said cutting tools being axially and radially movable with respect to an axial axis of said cutter shaft, and being rotatable in a circumferential direction of said cutter, said cutting edges axially extending from said cutting tools and having longitudinal axes which are parallel to the axial axis of said cutter shaft;

positioning said cutter such that a center of said cutter shaft is aligned with a center axis of said caliber and the longitudinal axis of the cutting edge of each cutting tool faces each roll and is maintained parallel with the center axis of said caliber;

feeding said cutting tools in a direction of the roll axis of a respective roll so that said cutting edges are maintained in a plane parallel to the respective roll axis and the axis of said caliber and cut said roll surfaces during a rotation of said rolls; and numerically controlling the positions of said cutting tools in said axial, radial and circumferential directions to cut a roll surface of each of said rolls into a surface which defines a central caliber surface and beveled surfaces on each side of said central caliber surface.

* * * * *